United States Patent

[11] 3,619,423

| [72] | Inventors | Pierre M. Galletti<br>Providence, R.I.;<br>Larry Martel, Boston, Mass.; Michael T. Snider, Providence, R.I. |
|---|---|---|
| [21] | Appl. No. | 30,112 |
| [22] | Filed | Apr. 20, 1970 |
| [45] | Patented | Nov. 9, 1971 |
| [73] | Assignee | The United States of America as represented by the Secretary of the Department of Health Education and Welfare |

[54] CASCADE DIALYSIS APPARATUS AND METHOD
10 Claims, 2 Drawing Figs.

[52] U.S. Cl. .................................................. 210/22,
210/23, 210/195, 210/196, 210/321
[51] Int. Cl. ...................................................... B01d 3/00,
B01d 13/00
[50] Field of Search .......................................... 210/22, 23,
321, 253, 259, 196, 195

[56] References Cited
UNITED STATES PATENTS

| 3,212,642 | 10/1965 | Kylstra ......................... | 210/321 |
| 3,463,728 | 8/1969 | Kolobrow et al. ............ | 210/22 |
| 3,506,126 | 4/1970 | Senfuss et al. ................ | 210/259 X |

OTHER REFERENCES

Flower; Chemical Engineering in Medicine The Artificial Kidney and Lung Machines, p. 131, May, 1968
Transactions–American Society for Artificial Organs, 1967, pp. 216– 220, 383, 384
Transactions–American Society for Artificial Organs, 1968, pp. 448 and 173

Primary Examiner—Reuben Friedman
Assistant Examiner—Richard Barnes
Attorney—Browdy and Neimark ABSTRACT: A system, such as an artificial kidney, is disclosed which facilitates the removal of undesirable substances found in a fluid material, such as blood. The system utilizes a dialyzer and an ultrafilter having selectively permeable membranes and having an endless fluid material recirculating flow path and pump. The dialyzer and ultrafilter are joined together by a dialysate endless loop recirculating flow path containing a chemical agent, such as an enzyme, which is utilized for the reduction of undesirable substances present in the blood. No chemical agents are introduced into the blood stream, nor are any of the desirable components of the blood removed in the practice of the invention.

PATENTED NOV 9 1971 3,619,423

INVENTORS
Pierre M. Gallette
Harry Martel
Michael A. Snider
Crowly and Numark
BY
ATTORNEYS 3,619,423

CASCADE DIALYSIS APPARATUS AND METHOD

BACKGROUND OF THE INVENTION

The present invention relates generally to a system, such as an artificial kidney, which is a closed extravascular compartment in which at least one undesirable component of a fluid material can be removed without the necessity of having to introduce any chemical reagents into the fluid material. More particularly, the invention relates to apparatus and methods for removing at least one undesirable component of a fluid material, such as blood, without removing the desirable constituents thereof. According to a preferred embodiment of the invention, the apparatus and method disclosed herein is particularly suitable for removing undesirable substances from blood which can be toxic in nature.

Prior hemodialysis systems, including those in common usage, suffer from a number of undesirable features including relatively high cost of operation. These devices are also limited in their ability to simulate all functions of the kidney.

It is, accordingly, an object of the present invention to overcome the defects of the prior art, including those indicated above.

It is another object of the present invention to provide for improved hemodialysis.

It is another object of the present invention to provide a method of treating diseases characterized by a specific biochemical defect which can be acted upon at the blood level and to provide apparatus which can be used for carrying out said method.

Another object of the invention is the development of an extravascular chemical reactor containing an active ingredient which can be used for selectively removing certain undesirable components of a fluid material and which can be recycled for long periods of time.

An additional object of the invention is a method and apparatus useful for cancer chemotherapy. Closely related to this object is the effective lowering of the asparagine levels of blood, which is characteristic of a number of leukemias and other neoplastic formations, without necessitating the removal of other desirable components of the blood.

Still another object of the invention is a method of utilizing a wide variety of enzymes, both toxic and nontoxic, for the treatment of various biochemical defects, without having the enzyme enter into the blood stream.

A still further important object of the invention which relates to the use of enzymes in a system which permits small molecular weight compounds to enter into a reaction zone and be altered by an enzyme with the degradation product as well as the other desirable components of the fluid material, being returned to the fluid material.

Still another, important object of the invention, is a process for lowering the level of a particular undesirable component of blood and eliminating the danger of the transfer of antigenic material to the subject.

Another object of the invention is the use of an artificial kidney having all of the above objects and further permitting the conservation of rare and/or expensive enzymes.

Still another object of the invention relates to the use of physical separation techniques such as centrifugation, electrophoresim and column adsorption to chemically eliminate toxic components of the dialysate.

BRIEF DESCRIPTION OF THE INVENTION

Briefly, the present invention relates to an apparatus, such as an artificial kidney system, comprising a first dialyzer and an ultrafilter. The dialyzer and ultrafilter both have membranes preferably of similar pore size and are connected to a dialysate endless loop recirculating flow path having a pump, which can also be regarded as a second dialyzing unit. Thus, the present invention relates to cascade dialysis of a fluid material, such as blood. The pump in the dialysate endless loop recirculating flow path has an inlet communicating with the first dialyzer and an outlet communicating with the ultrafilter inlet. The ultrafilter has a conduit which carries the filtrate back to the endless fluid material recirculating flow path or dialyzer.

The invention will be better understood and objects other than those set forth above will become apparent, when consideration is given to the following detailed description which makes reference to the annexed drawing presenting preferred illustrative embodiments of the invention and wherein:

FIG. 1 is a schematic illustration of a preferred arrangement of the cascade dialysis system which is employed to selectively reduce the amounts of certain undesirable components present in a fluid material, such as blood: and FIG. 2 is a graph showing the composition results of example II.

DETAILED DESCRIPTION OF THE INVENTION

Figure 1:
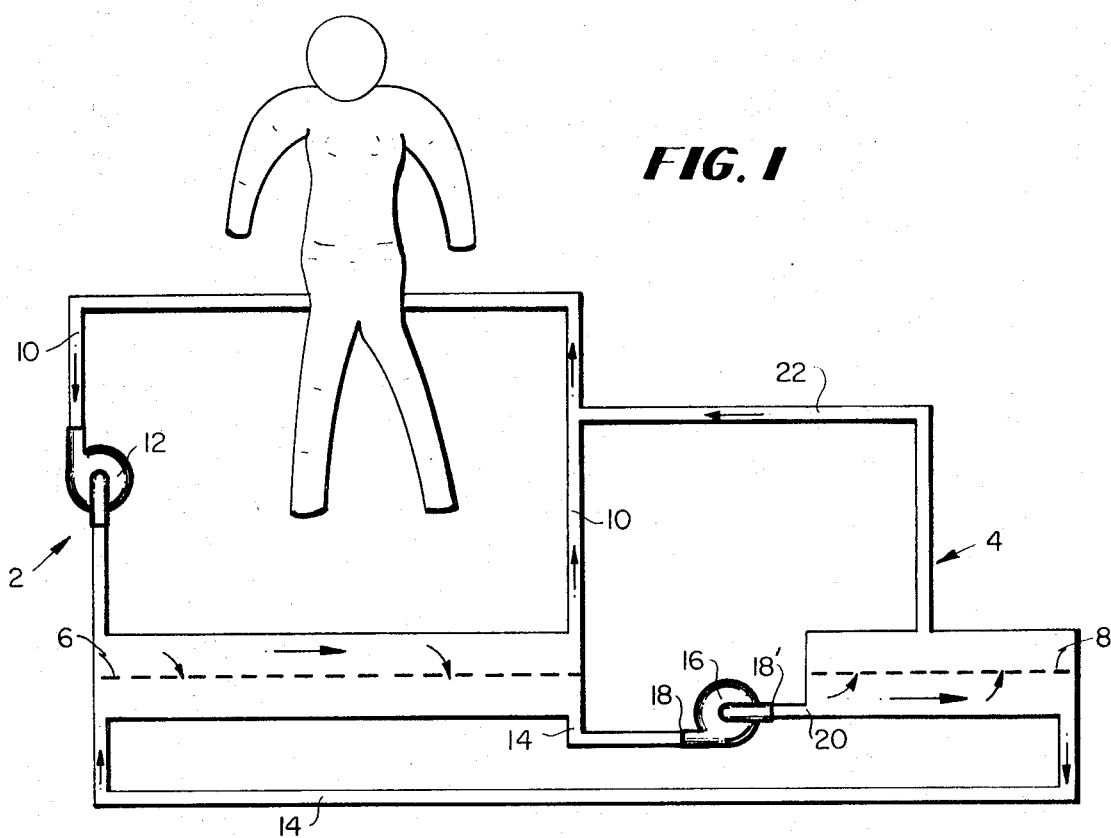

Referring now, more specifically to FIG. 1, the cascade dialysis apparatus illustrated therein, which according to a preferred embodiment of the invention, is an artificial kidney system. The apparatus comprises a dialyzer portion 2 and an ultrafilter portion 4. Both the dialyzer 2 and the ultrafilter 4 have membranes 6 and 8, which can be of a similar pore size. The dialyzer 2 has an endless fluid recirculating flow path 10 with a pump 12 which facilitates the recirculation of the fluid material, which, in the case of an artificial kidney system, is blood. Connecting both the dialyzer 2 and the ultrafilter 4 is a dialysis endless loop recirculating flow path 14 which also contains a pump 16. The pump 16 has an inlet 18 communicating with the dialyzer portion 2 and an outlet 18' communicating with the inlet 20 of the ultrafilter portion 4 of the dialysis loop 14. The ultrafilter 4 has a conduit 22 which carries the filtrate resulting from the ultrafiltrating operation to the endless fluid recirculating flow path 10.

According to a preferred embodiment of the invention, the blood from a living person or animal passes from an artery by means of an artery-to-vein shunt and circulates outside of the body in a compartment, such as the dialyzer 2 along the flow path 10. Most of the blood components are maintained along the path 10 by the semipermeable membrane 6; however, the low molecular weight components pass through the membrane 6. The liquid phase, that is, the dialysate endless loop recirculating flow path 14, circulating outside of the semipermeable membrane 6, contains a chemical agent such as an enzyme which can suitably be reacted with specific plasma constituents once these particular constituents from the blood have permeated through the membrane 6 into the dialysate endless loop recirculating flow path 14 which is continuously recirculating under positive pressure by means of the pump 16.

The membrane 8, which is located along the path 14 in the untrafilter portion 4, is preferably similar to the membrane 6 with respect to pore size, i.e., both membranes are of a pore size sufficient to permit the passage of certain components of the fluid material through the membranes but not sufficient in size to permit the chemical agent or enzyme in the recirculating flow path 14 to escape through the membrane 8. Those blood constituents which have passed through the membrane 6 have been treated in flow path 14 are then ultrafiltrated by membrane 8, such purified components then passing along path 22 into path 10 for passage to the vein of the subject. The end products produced from the chemical action of an enzyme or other chemical agent on the undesirable component of the fluid material are usually returned by ultrafiltration through the membrane 8 and then passed along path 22 for return to the blood stream; however, depending on the specific treatment involved, the degradation products may alternatively be retained in the dialysate endless loop 14 by specific or nonspecific adsorption techniques.

According to a preferred embodiment of the invention, a closed extracorporeal, extravascular compartment can be utilized for the treatment and selective removal of certain components of blood without the necessity of having to introduce any chemical reagents into the blood per se. This can be achieved by using, for example, cellulosic membranes having a cutoff point of 10,000 molecular weight, i.e., a pore size such that particles of M.W. less than 10,000 will pass therethrough while those of greater M.W. will not pass therethrough. Small solutes having a molecular weight less than 10,000 will then pass relatively freely from the dialyzer 2 into the dialysate endless loop 14 recirculating flow path 14 which can also be referred to as the enzyme phase. However, the enzyme which is present in the dialysate endless loop recirculating flow path 10 will normally be a protein with a molecular weight above 100,000 and will not be able to pass into the blood phase. Of course other high molecular weight compounds can be substituted for the enzymes in the selective removal of certain undesirable components of a fluid material. Thus, in accordance with a preferred embodiment of the invention, it is possible to reduce particular constituents of blood plasma to vary low levels. This is accomplished by employing an enzyme, or other chemical agent, which will result in the degradation of the particular undesirable constituent which has passed through the membrane 6 into the passage 14. With the breakdown of the undesirable constituent, the degradation products can be removed by a continuous ultrafiltration process through membrane 8 and be returned to the blood stream along with other plasma constituents not affected by the enzyme or other chemical agent. Thus, all the chemical constituents of the blood plasma which permeate through the first membrane 6, but do not react with the enzyme or chemical agent, will also permeate through the second membrane 8 and return unchanged to the blood stream.

In operation, a fluid material such as blood is introduced into an endless recirculating path, such as dialyzer 2, which is illustrated in FIG. 1. The fluid material is exposed to one side of a selectively permeable membrane, and the fluid material contains at least one component which is permeable through the membrane with at least one of said permeable components being an undesirable component of the fluid material. The separation of the undesirable component of a fluid material, such as blood, is accomplished in a variety or ways, including chemical separation methods such as that discussed hereinbefore, and, according to another embodiment of the invention, physical separation methods such as chromatography or electrophoresis can also be employed. The separation takes place in a dialysate recirculating flow path when chemical separation methods are employed.

The degradation products together with those components not affected by the chemical agent, are then removed from the separation zone or the dialysate recirculating flow path by ultrafiltration. Ultrafiltration refers to a process of separation whereby a solution containing a solute of molecular dimensions significantly less than the solvent is caused to pass through a suitable membrane. The degradation products together with those components of the fluid material which were not caused to breakdown or otherwise be separated by chemical or physical separation processes, are then returned to the endless recirculating flow path 22, which in the case of an artificial kidney system, is an arterial-venous shunt.

The nature of the enzyme employed in the dialysate endless loop recirculating flow path can be any type of enzyme which will effectively cause a particular undesirable component of blood to break down. Thus, the use of these particular enzymes enables specific biochemical defects to be cured by utilizing any type of enzyme or other chemical material, even if it is antigenic. The use of antigenic or otherwise toxic or contaminated enzymes does not present any problem to the subject because the enzymes are continuously recirculated in the dialysate endless loop recirculating flow path 14 and cannot pass through the selectively permeable membrane which effectively prevents the passage of an enzyme or other chemical agent into the blood stream. A particularly suitable enzyme useful for depleting the blood of the amino acid l-asparagine is L-asparaginase.

With respect to the selectively permeable membranes to be employed in the practice of the invention it is important to employ those membranes which are capable of separating solutes from such complex mixtures as blood. Preferred membranes include those which are cellulosic and best results so far have been obtained by employing cuprophane membranes. The membranes employed in the practice of the invention should have a cutoff point such that those components which are to be removed from a fluid material, are able to pass through the membranes and thus be removed by suitable physical or chemical separation processes. The membrane 6 which separates dialyzer 2 and the dialysate endless loop recirculating flow path 14 from ultrafilter 4, can both have approximately the same pore size although they may have different pore sizes provided that the component to be removed from the fluid material is permeable through each membrane but the chemical agent or enzyme cannot permeate or otherwise pass through the membrane and thus enter the blood stream as in the case of an artificial kidney system. This is extremely important to the successful practice of the invention because certain toxic enzymes could have serious effects on the subject.

ILLUSTRATIVE EXAMPLES

Example 1

The feasibility of the method of this invention is demonstrated with the following equipment:

a. A dog was used as the experimental animal. A femoral artery-to-vein shunt, controlled by a blood pump, served for the extracorporeal circuit.

b. The blood from the animal circulated in the endless blood recirculating flow path of a two square meter Klung dialyzer equipped with cuprophane membranes. The dialyzer was built in accordance with the procedures set forth in Galletti et al., Trans. ASAIO 8:47, 1:9 62; Someren et al., Trans. ASAIO 9:73, 1963; Sweeney et al., Trans. ASAIO 10:3, 1964; Shinaberger et al., Trans. ASAIO 12:363, 1966.

c. From the first dialysis unit (i.e., the endless blood recirculating flow path), the blood passed into a bubble trap and returned to the femoral vein.

d. The dialysate endless loop recirculating flow path was filled with a physiologic solution containing L-asparaginase at a concentration approximately 50 micromolar units per ml./in 1.3 liter. This solution was continuously sucked out of its compartment in the first dialyzer by a roller pump in order to create a large pressure differential across the membrane.

e. The pump was used to such the asparaginase-containing dialysate pushed that fluid under positive pressure into the "blooc," or "high pressure" compartment of a second Klung dialyzer. This second dialyzer was similar to the first one in terms of exchange area (two square meters) and membrane (cuprophane).

f. At equilibrium, the pressure differential developed across the membrane in the second dialyzer was such that the water-flux equalled that in the first dialysis unit. Thus the volume of the extracorporeal compartment remained constant.

g. The ultrafiltrate of the second dialyzer was continuously returned to the venous leg of the artery-to-vein shunt, at the level of the bubble trap mentioned under c, above.

Example 2

An experiment was conducted in order to determine the usefulness of the apparatus of the invention with respect to removing a specific plasma constituent. In the first series of tests, an open circuit hemodialysis was carried out for sixteen hours using a conventional Klung dialyzer equipped with a 2m.$^2$ cuprophane membrane, and having a blood flow of 200 ml./min., and nonrecirculating dialysate flow of 600 ml./min.

Figure 2:
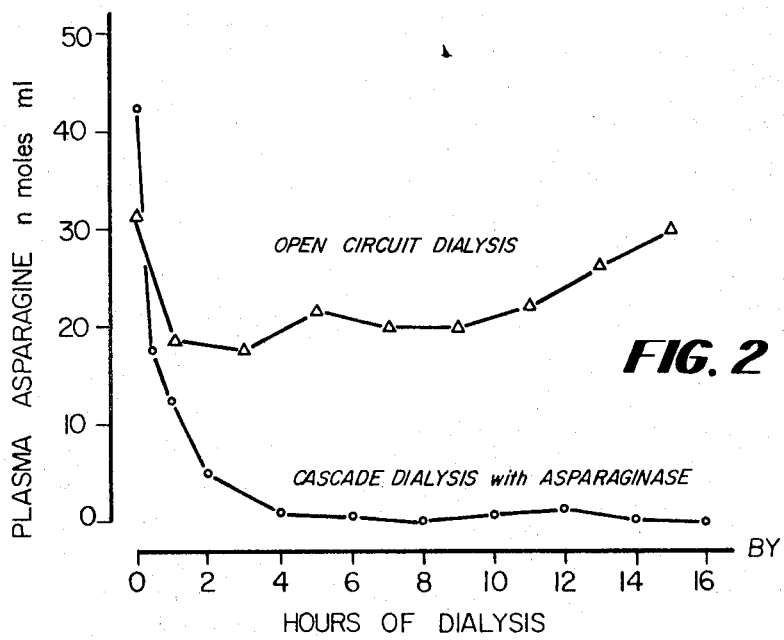

In the second series of experiments, carried out in accordance with the present invention, about $10^3$ units of L-asparaginase were added to 1.3 liters of recirculating dialysate in the path 14 under the same flow conditions. The recycling dialysate was submitted to continuous ultrafiltration in a second artificial kidney equipped with a 2m.$^2$ surface area of a cuprophane membrane 8. The ultrafiltrate was returned to the venous system through line 22 at the rate of about 600 ml. per hour. In this system, plasma containing asparagine having a molecular weight of 133 passed quite freely into the dialysate through membrane 6 and was split by the enzyme (molecular weight about 134,000) into aspartic acid and ammonia, and the degradation products were returned to the vascular system through membrane 8. With the conventional hemodialysis operation, the plasma asparagine levels did not fall significantly below the control level of $30\pm10\,n$ moles/ml. although the quantity of asparagine removed approximated 14 times the total plasma content under control conditions. In carrying out a hemodialysis in accordance with this invention suing L-asparaginase, plasma levels fell below 2 moles/ml. within 4 hours and maintained that level for the duration of the procedure. Hemodialysis against enzyme containing solutions permits depletion of a specific plasma component without introducing the enzyme itself in the blood stream. The comparative data of the tests conducted are set forth in FIG. 2.

After considering the foregoing description and the immedately preceding examples, it should be apparent that the objects set forth at the outset of this specification have been successfully achieved.

What is claimed is:

1. A cascade dialysis system comprising a dialyzer and an ultrafilter each having a first and second side separated by selectively permeable membranes said system having fluid material recirculating flow path conduit means and pump, and a dialysate recirculating flow path means and second pump, said second pump having an inlet communicating with outlet means from the second side of said dialyzer and an outlet communicating with inlet means to the second side of said ultrafilter, and dialysate recirculating flowpath means providing flow between outlet means on the second side of said ultrafilter and inlet means on the second side of said dialyzer, said fluid material recirculating flow path conduit means providing flow between an outlet on the first side of said dialyzer and an inlet on the first side of said dialyzer and an outlet on the first side of said ultrafilter connected with said fluid material recirculating flow path, conduit means, the inlet means and outlet means of said ultrafilter being the only means by which said dialyzer is in direct flow communication with said ultrafilter.

2. A cascade dialysis system according to claim 1, wherein each of said selectively permeable membranes is a cellulosic material.

3. A cascade dialysis system according to claim 1, wherein said dialysate recirculating flow path means contains a chemical agent useful for selectively removing undesirable components of said fluid material permeating through one of said membranes.

4. A cascade dialysis system according to claim 3, wherein said chemical agent is an enzyme and said membranes each have a pore size sufficiently small to prevent said enzyme from passing therethrough.

5. A cascade dialysis system according to claim 4, useful as an artificial kidney system and said fluid material being blood.

6. A cascade dialysis system according to claim 5 wherein said enzyme is L-asparaginase, said L-asparaginase being present in an amount sufficient to deplete the blood of the amino acid 1-asparagine.

7. A method for purifying a fluid material using the apparatus of claim 1 in order to remove undesirable constituents from said fluid without introducing any chemical reactants into said fluid material, said method comprising the steps of
   introducing said fluid material into a fluid material recirculating flowpath conduit means and exposing said fluid material to the first side of a selectively permeable membrane in a dialyzer, said fluid having at least one component permeable through said membrane, and at least one of said permeable components being undesirable;
   b. separating said undesirable component form other desirable components permeable through said membrane;
   c. ultrafiltrating said desirable components into a conduit by passing said components through a second selectively permeable membrane, and
   d. returning said remaining components to said fluid material recirculating flowpath conduit means has been inserted in its place.

8. A method according to claim 7, wherein said fluid material is blood which includes the step of placing said blood in the fluid material recirculating flow path conduit means in osmotic contact with a dialyzing liquid capable of receiving undesirable constituents of said blood through said selectively permeable membrane.

9. A method according to claim 8 which further comprises the step of removing said undesirable components while retaining desirable components of said blood.

10. A method according to claim 8 which further comprises the step of adding an enzyme suitable for removing particular undesirable components of blood passing though said selectively permeable membrane while retaining the desirable blood components.

* * * * *